US010322808B2

(12) United States Patent
Alamgir et al.

(10) Patent No.: US 10,322,808 B2
(45) Date of Patent: Jun. 18, 2019

(54) EXPANDABLE SEAT LEG ATTACHMENT FIXTURE

(71) Applicant: Safran Seats USA LLC, Gainesville, TX (US)

(72) Inventors: Farhan Alamgir, Denton, TX (US); Robert Trimble, Gainesville, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/505,765

(22) PCT Filed: Sep. 4, 2015

(86) PCT No.: PCT/US2015/048563
§ 371 (c)(1),
(2) Date: Feb. 22, 2017

(87) PCT Pub. No.: WO2016/037069
PCT Pub. Date: Mar. 10, 2016

(65) Prior Publication Data
US 2017/0274999 A1    Sep. 28, 2017

Related U.S. Application Data

(60) Provisional application No. 62/045,597, filed on Sep. 4, 2014.

(51) Int. Cl.
*B64D 11/06* (2006.01)
*B60N 2/42* (2006.01)
(Continued)

(52) U.S. Cl.
CPC .......... *B64D 11/0619* (2014.12); *B60N 2/005* (2013.01); *B64D 11/06* (2013.01);
(Continued)

(58) Field of Classification Search
CPC . B64D 11/0619; B64D 11/0696; B64D 11/06; B64D 25/04; B60N 2/42;
(Continued)

(56) References Cited

U.S. PATENT DOCUMENTS

| 749,640 A | * | 1/1904 | Sutherland | B64D 11/06 297/165 |
| 3,968,863 A | * | 7/1976 | Reilly | B64D 25/04 188/372 |

(Continued)

FOREIGN PATENT DOCUMENTS

| EP | 1190944 | 3/2002 |
| WO | 1997028983 | 8/1997 |
| WO | 2013076255 | 5/2013 |

OTHER PUBLICATIONS

International Patent Application No. PCT/US2015/048563, Search Report and Written Opinion, dated Nov. 24, 2015.

*Primary Examiner* — Kyle J. Walraed-Sullivan
(74) *Attorney, Agent, or Firm* — Kilpatrick Townsend & Stockton LLP; Dean W. Russell; Davidson G. Lucas

(57) ABSTRACT

Described is an extendable joint (10,100) for attaching a passenger seat to a cabin floor or support structure. The extendable joint (10,100) exhibits behavior of a rigid mounting during normal usage, such as when carrying or securing passengers or luggage. However, if a force threshold is exceeded, such as with an emergency situation, the extendable joint (10,100) may lengthen to absorb energy applied from the cabin floor through the passenger seat and vice versa. Additional force damping mechanisms may also be incorporated into the joint to further absorb, distribute, or reduce loadings that may otherwise separate the passenger seat from the floor or support structure.

23 Claims, 16 Drawing Sheets

(51) Int. Cl.
  *B64D 25/04* (2006.01)
  *B60N 2/005* (2006.01)
  *B60N 2/427* (2006.01)

(52) U.S. Cl.
  CPC .......... *B64D 25/04* (2013.01); *B60N 2/42736* (2013.01); *B64D 11/0696* (2013.01)

(58) Field of Classification Search
  CPC .. B60N 2/4214; B60N 2/4221; B60N 2/4228; B60N 2/4235; B60N 2/4242; B60N 2/4263; B60N 2/42718; B60N 2/42763; B60N 2/42736; B60N 2/4278
  See application file for complete search history.

(56) References Cited

U.S. PATENT DOCUMENTS

| | | | | |
|---|---|---|---|---|
| 4,153,293 A * | 5/1979 | Sheldon | ................ | B60N 2/667 297/230.14 |
| 4,720,139 A * | 1/1988 | McSmith | ............ | B60N 2/4214 188/373 |
| 5,553,923 A * | 9/1996 | Bilezikjian | ............ | B64D 11/06 297/232 |
| 5,730,492 A * | 3/1998 | Warrick | ................ | B60N 2/4221 297/216.2 |
| 6,412,864 B1 * | 7/2002 | Larson | ................ | B60N 2/242 244/122 R |
| 6,793,285 B1 * | 9/2004 | Tame | ................ | B60N 2/3011 297/336 |
| 7,393,167 B2 * | 7/2008 | Dowty | ............... | B64D 11/0619 410/105 |
| 8,226,163 B1 * | 7/2012 | Pearson | ............ | B64D 11/0696 296/68.1 |
| 8,973,987 B2 * | 3/2015 | Mo | ....................... | B60N 2/2884 297/216.11 |
| 9,663,232 B1 * | 5/2017 | Porter | ................ | B64D 11/0696 |
| 2002/0033622 A1 * | 3/2002 | Jarnail | ................ | B60N 2/4221 297/216.2 |
| 2003/0094542 A1 * | 5/2003 | Williamson | ........... | B60N 2/015 244/122 R |
| 2005/0161988 A1 * | 7/2005 | Minai | ................ | B60N 2/42763 297/216.1 |
| 2005/0161991 A1 * | 7/2005 | Minai | ................ | B60N 2/0732 297/344.11 |
| 2005/0269844 A1 * | 12/2005 | Abt | ........................ | B60N 2/045 297/16.2 |
| 2006/0263164 A1 * | 11/2006 | Dowty | ............... | B64D 11/0696 410/105 |
| 2008/0303262 A1 * | 12/2008 | Sakakida | ............... | B60N 2/865 280/806 |
| 2009/0045659 A1 * | 2/2009 | List | ..................... | B60N 2/42736 297/216.15 |
| 2009/0194366 A1 * | 8/2009 | Parker | .................... | A62B 35/04 182/3 |
| 2010/0074680 A1 * | 3/2010 | Vine | ................... | B64D 11/0696 403/300 |
| 2010/0090060 A1 * | 4/2010 | Marechal | ........... | B64D 11/0696 244/118.6 |
| 2010/0096502 A1 * | 4/2010 | VanderWolk | ...... | B64D 11/0696 244/122 R |
| 2010/0176621 A1 * | 7/2010 | Aufrere | ................... | B60N 2/015 296/68.1 |
| 2010/0194157 A1 * | 8/2010 | Nitsuma | ............... | B60N 2/4228 297/216.1 |
| 2010/0253129 A1 * | 10/2010 | Dowty | ................ | B64D 11/064 297/85 M |
| 2012/0205329 A1 * | 8/2012 | Fujita | ................. | B60N 2/01558 211/27 |
| 2014/0138991 A1 * | 5/2014 | Deimen | .................. | B60N 2/203 297/101 |
| 2014/0232153 A1 * | 8/2014 | Bell | ...................... | B29C 70/545 297/232 |
| 2014/0375090 A1 * | 12/2014 | Wegenka | ............... | B60N 2/242 297/188.09 |
| 2015/0035327 A1 * | 2/2015 | Ferenc | ................... | B60N 2/4235 297/216.1 |
| 2015/0035340 A1 * | 2/2015 | Lussan | ................... | B64D 11/06 297/463.1 |
| 2015/0042133 A1 * | 2/2015 | Munemura | .......... | B60N 2/4228 297/216.14 |
| 2015/0158401 A1 * | 6/2015 | Keller | ...................... | B60N 2/24 297/216.19 |
| 2016/0023769 A1 * | 1/2016 | Zheng | ................ | B64D 11/0648 297/452.18 |
| 2016/0107542 A1 * | 4/2016 | Trimble | ............. | B60N 2/01575 296/65.03 |
| 2016/0107549 A1 * | 4/2016 | Janicek | ................ | B60N 2/0722 297/216.1 |
| 2016/0251082 A1 * | 9/2016 | Shih | ................... | B64D 11/0696 248/636 |
| 2017/0152046 A1 * | 6/2017 | Ozaki | ................. | B60N 2/427 |

\* cited by examiner

EXPANDABLE SEAT LEG ATTACHMENT FIXTURE

CROSS REFERENCE TO RELATED APPLICATIONS

This patent application is the U.S. national stage of PCT/US2015/048563 ("the '563 application"), filed on Sep. 4, 2015, which application is related to and claims priority benefits from U.S. Provisional Application Ser. No. 62/045,597 ("the '597 application"), filed on Sep. 4, 2014, entitled "Pitch Reducing Fixture". The '563 and '597 applications are hereby incorporated in their entireties by this reference.

FIELD OF THE INVENTION

The field of the invention relates to passenger seats or the like, and more particularly to safety components for passenger seats.

BACKGROUND

There has been continuous movement in carrier industries, particularly with respect to air carriers, to improve and enhance passenger safety, particularly in the area of regulatory compliance. Passenger seats must pass through a number of regulatory tests and certifications before they may be installed in commercial vehicles. As a result, there is a push for new technologies to improve passenger safety in survivable crashes and maintain regulatory compliance by passing all applicable safety testing.

Passenger seats have traditionally been rigidly mounted to a cabin floor or other support structure within the vehicle. Rigid mounting of seats improves passenger confidence and comfort. However, during an emergency such as a survivable crash, deformation of the cabin floor or support structures can lead to excessive loading and separation of the passenger seat attachment points from the cabin floor or support structures. Separation of the passenger seats from the cabin floor or support structures not only results in reduced survivability for passengers, but fails to meet certain regulatory requirements. In particular, Federal Aviation Administration guidelines contained within 14 C.F.R. 25.562, sometimes referred to as the 16G Pitch and Roll Test, mandate that a seat mounting may not separate from a cabin floor in the event of a distortion of the cabin floor equivalent to a ten degree pitch and ten degree roll.

In certain cases, it may be desirable to provide a passenger seat with an extendable joint between the passenger seat frame and the cabin floor or support structure. The extendable joint, which is preloaded or otherwise restricted to prevent motion in normal circumstances, allows the passenger seat legs or frame to extend and move with the cabin floor or support structure when it deforms. The extension of the passenger seat frame or leg absorbs and distributes the forces applied to the passenger seat over a longer period of time and a greater range of motion. The result is decreased loading of the seat to floor attachment points and seat frame resulting in a reduced likelihood of separation between the passenger seat and the cabin floor, or failure of other parts of the passenger seat frame. The extendable joint also provides opportunities for additional components, such as crushable inserts or springs, that may be used to further absorb forces resulting from a crash or emergency situation.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an extendable joint may comprise a first joint portion, a second joint portion, and a preload mechanism. The preload mechanism may stabilize the extendable joint up to a threshold force and allow relative motion between the first joint portion and the second joint portion beyond the threshold force.

In some embodiments, the extendable joint may further comprise a third joint portion and a rotation joint. The second joint portion and the third joint portion may then rotate with respect to one another about the rotation joint.

In certain embodiments, the extendable joint may further comprise a first slot in the first joint portion and a second slot in the second joint portion. The first slot and the second slot may comprise a curve matching an arc of motion of the extendable joint.

In some embodiments, the first joint portion may be configured to telescope relative to the second joint portion.

In certain embodiments, the first joint portion and the second joint may form a double-lap joint.

In some embodiments, the preload mechanism may be selected from the group consisting of a bolt, a friction washer, a shear fastener, a rip-through material, a crush material, a corrugated metal, a honeycomb, and a collapsible tube.

In certain embodiments, the extendable joint may further comprise a rebound damping mechanism. The damping mechanism may be selected from the group consisting of a spring, a damper, a crushable component, a shear pin, friction, binding of the extendable joint, galling of the first joint portion, galling of the second joint portion, and a friction washer.

In some embodiments, the first joint portion may comprise a front seat leg with a first slot and a first clearance recess, the second joint portion may comprise an extension fixture with a second slot and a second clearance recess, and the preload mechanism may comprise a bolt passing through the first slot and the second slot. The bolt may be torqued to a preload to prevent the relative motion of the front seat leg and the extension fixture up to the threshold force. The first clearance recess may accommodate a portion of the extension fixture, and the second clearance recess may accommodate a portion of the front seat leg.

According to certain embodiments of the present invention, a passenger seat may comprise a front seat leg, which may comprise a first slot and a first clearance recess, a rear seat leg, a base member, a rear leg joint, an extension fixture, which may comprise a second slot and a second clearance recess, and a preload mechanism. The front seat leg and the extension fixture may be coupled such that the first slot and the second slot are overlapping. The first clearance recess may accept a portion of the extension fixture, and the second clearance recess may accept a portion of the front seat leg to form an extendable joint. The preload mechanism may prevent relative motion of the front seat leg and the extension fixture below a threshold force.

In some embodiments, the base member may be rotatably coupled to the extension fixture to allow rotation of the base member with respect to the extension fixture and the front seat leg.

In certain embodiments, the passenger seat may further comprise a baggage loop configured to receive a baggage bar.

In some embodiments, the front seat leg may telescope with respect to the extension fixture.

In certain embodiments, the preload mechanism may be selected from the group consisting of a bolt, a friction washer, a shear fastener, a rip-through material, a crush material, a corrugated metal, a honeycomb, and a collapsible tube.

In some embodiments, the passenger seat may further comprise a rebound damping mechanism. The rebound damping mechanism may be selected from the group consisting of a spring, a damper, a crushable component, a shear pin, friction, binding of the extendable joint, galling of the front seat leg, galling of the extension fixture, and a friction washer.

According to certain embodiments of the present invention, a method for preventing separation of a passenger seat from a cabin floor may comprise providing a joint between a front seat leg and the cabin floor, preloading the joint to prevent relative motion of the front seat leg and the cabin floor under normal conditions, and lengthening the joint such that the cabin floor and the front seat leg may partially separate in response to a force exceeding a threshold determined by the preloading of the joint.

In some embodiments, the method for preventing separation of a passenger seat from the cabin floor may further comprise damping a rebound motion of the joint.

In certain embodiments, the method for preventing separation of a passenger seat from the cabin floor may further comprise providing a rotation joint between a base member and the cabin floor and rotating the base member relative to the cabin floor to prevent separation of the passenger seat from the cabin floor.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide for an extendable attachment joint for securing the front leg of a passenger seat to a floor or other structural support. While the extendable joints are discussed for use with airline passenger seats, they are by no means so limited. Rather, embodiments of the extendable joint may be used in any passenger seat including, but not limited to, automotive, marine, bus, train, or other commercial passenger seats.

Figure 1:
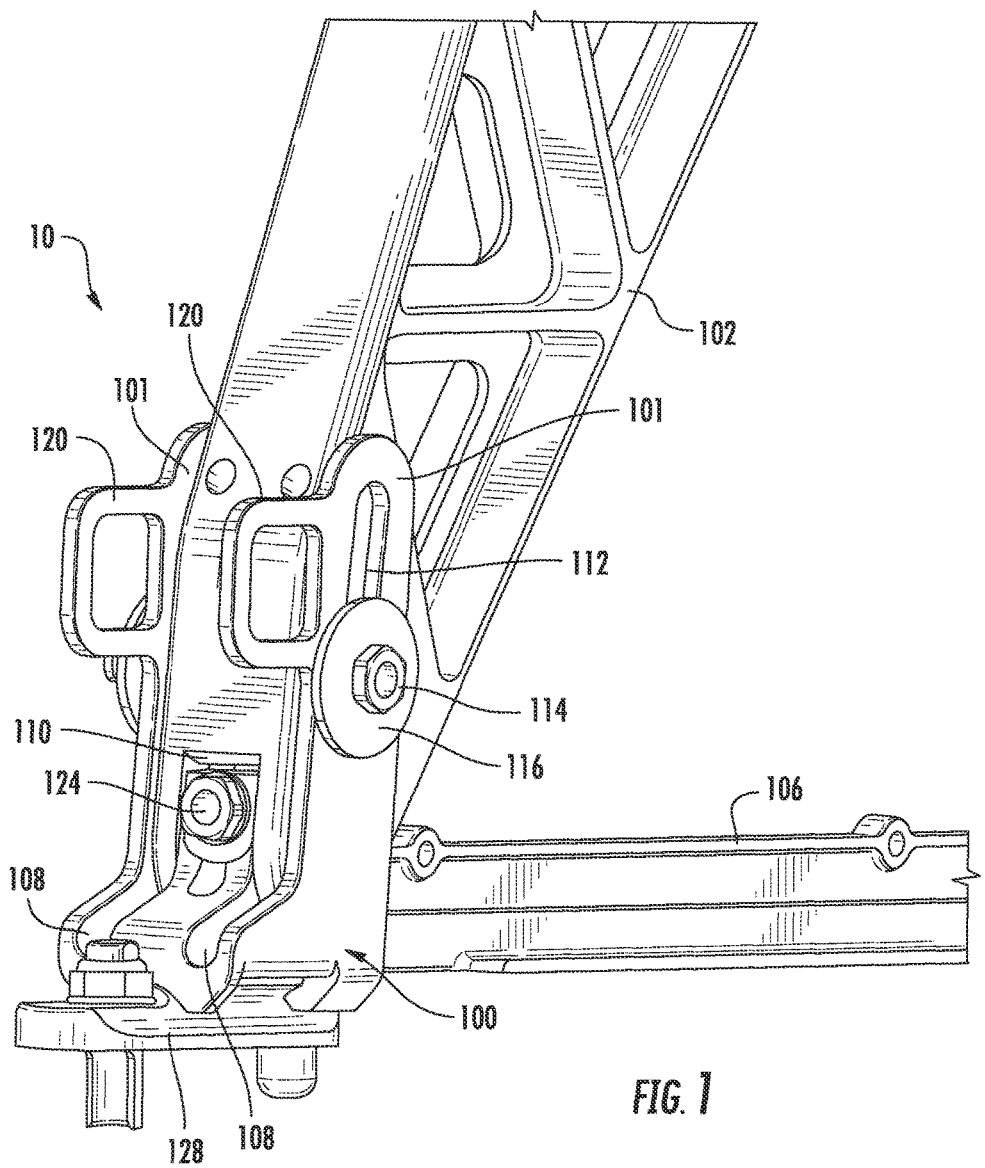
FIG. 1 is a perspective view of an extension joint according to certain embodiments of the present invention.
Figure 2:
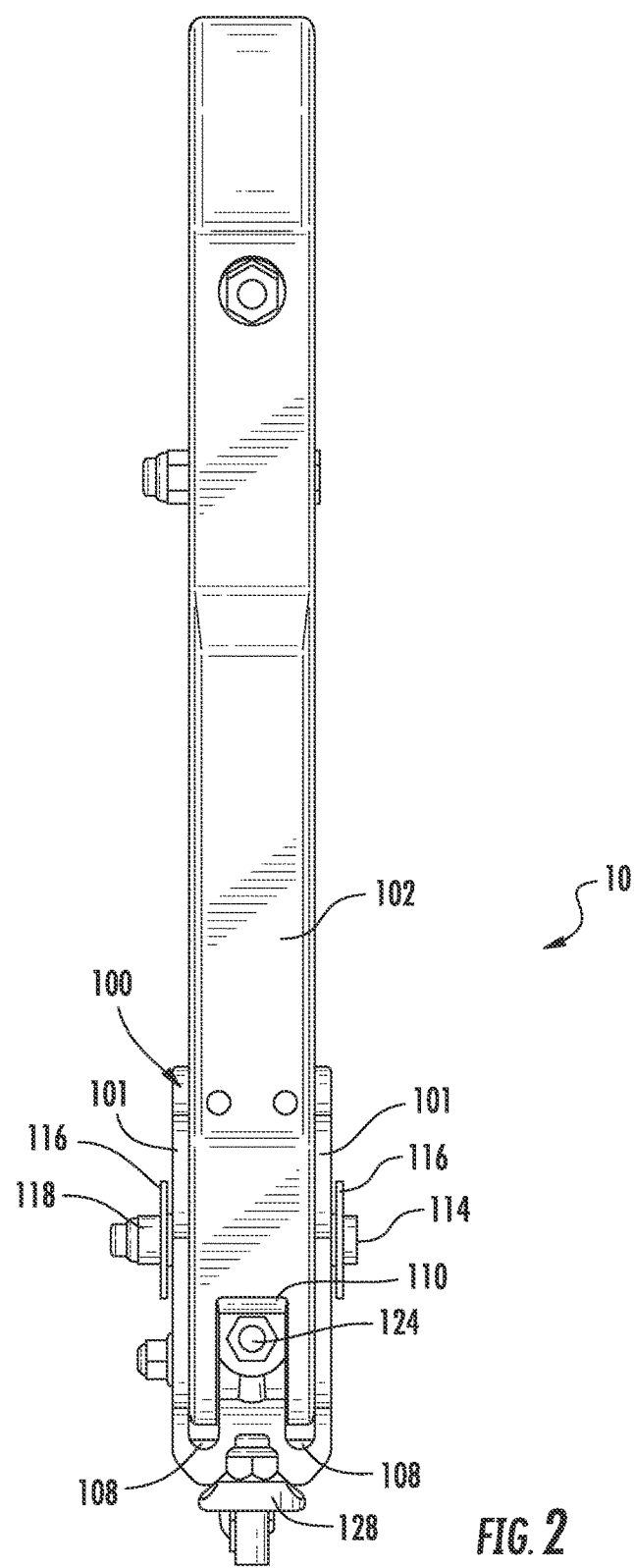
FIG. 2 is a front elevation view of the extension joint of FIG. 1.
Figure 3:
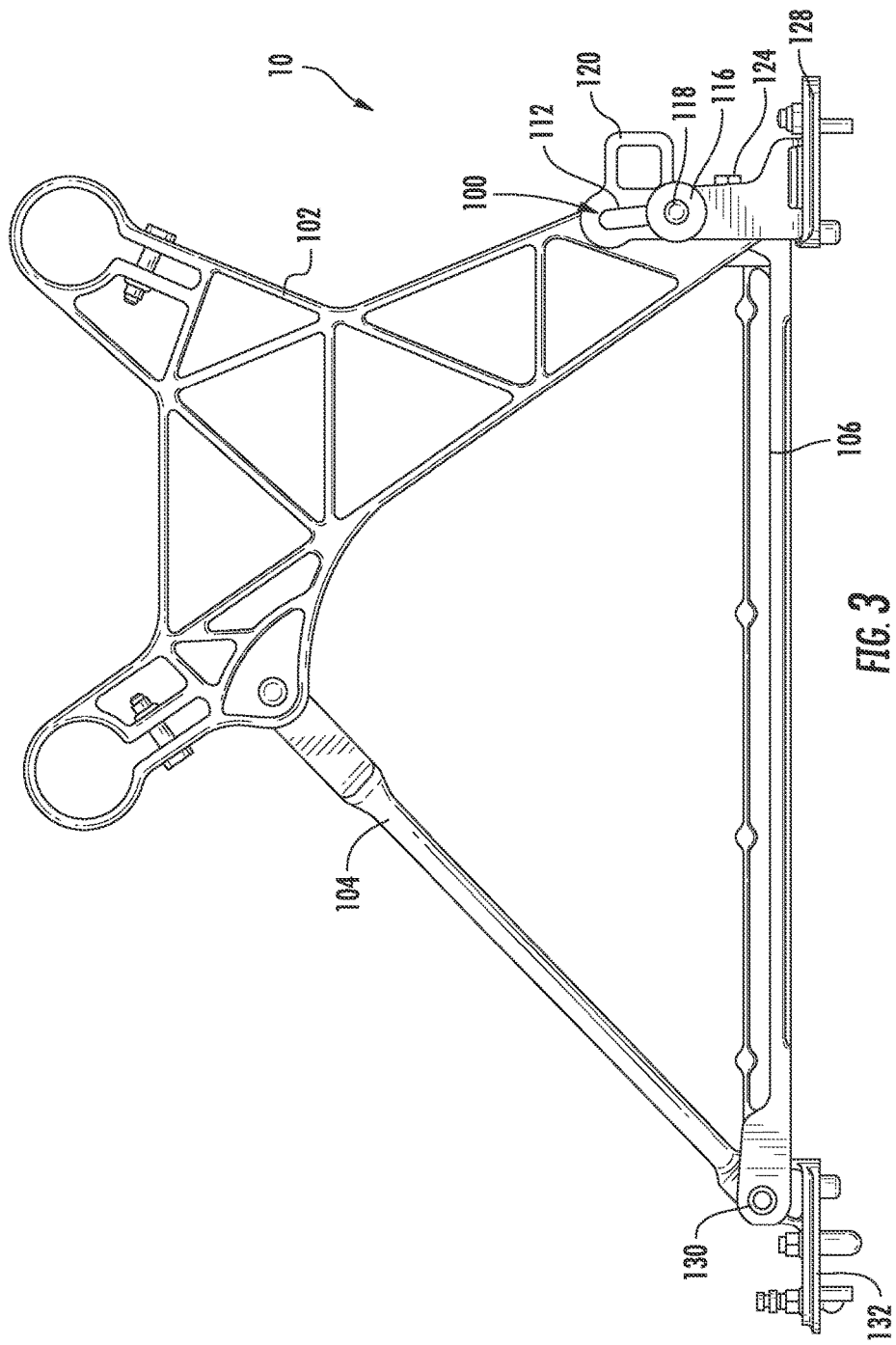
FIG. 3 is a side elevation view of the extension joint of FIG. 1.

In some embodiments of the present invention, as shown in FIGS. 1-3, an extension joint 10 comprises an extension fixture 100 coupled to a front seat leg 102 and optionally a base member 106. A rear seat leg 104 may also be coupled to the front seat leg 102 and the base member 106 and connected to the cabin floor or other support structure at the rear leg joint 130. The front seat leg 102, rear seat leg 104, and base member 106 may be affixed or otherwise attached to one another to form a basic passenger seat leg assembly, which carries the load from a passenger and associated seat hardware and transfers that load into the cabin floor or other support structures (not shown). In certain embodiments, the rear leg joint 130 may allow the rear seat leg 104 and/or base member 106 to rotate, freely or with some level of resistance, about the rear leg joint 130 and/or the rear floor mount 132. The front seat leg 102 and base member 106 may be joined together at the extension fixture 100, which may be attached to the cabin floor or other support structures through the front floor mount 128.

The front seat leg 102 and base member 106 are attached to the front floor mount 128 through the extension fixture 100. The extension fixture 100 may comprise one or more uprights 101 with apertures such as fixture slots 112. In certain embodiments, the fixture slots 112 may be straight, or they may be curved or otherwise contoured such that the fixture slots 112 follow the arc of rotation defined by the distance of the fixture slot from the rear leg joint 130. A curved or otherwise contoured fixture slot 112 may then allow the base member 106 to rotate about the rear leg joint 130 through the range of motion of the extension joint 10 without binding. The front seat leg 102 is affixed or otherwise attached to the extension fixture 100 through the use of a bolt 114 that passes through the fixture slots 112 and is secured with a nut 118. In some embodiments, washers 116 may be used to distribute the forces from the bolt 114 and nut 118 and/or to modify or alter the preloading and fixture properties of the bolt 114 and nut 118 as they pass through the fixture slots 112 and front seat leg 102. The base member 106 may be attached to the extension fixture 100 with a bolt 124. In certain embodiments, the base member 106 is affixed or attached to the extension fixture 100 through a rotation joint 122 (FIG. 4) that allows for the extension fixture 100 to rotate about the axis of the bolt 124 relative to the base member 106. The extension fixture 100 may then be affixed or otherwise attached to the cabin floor or other support structure directly or through the front floor mount 128.

Figure 5:
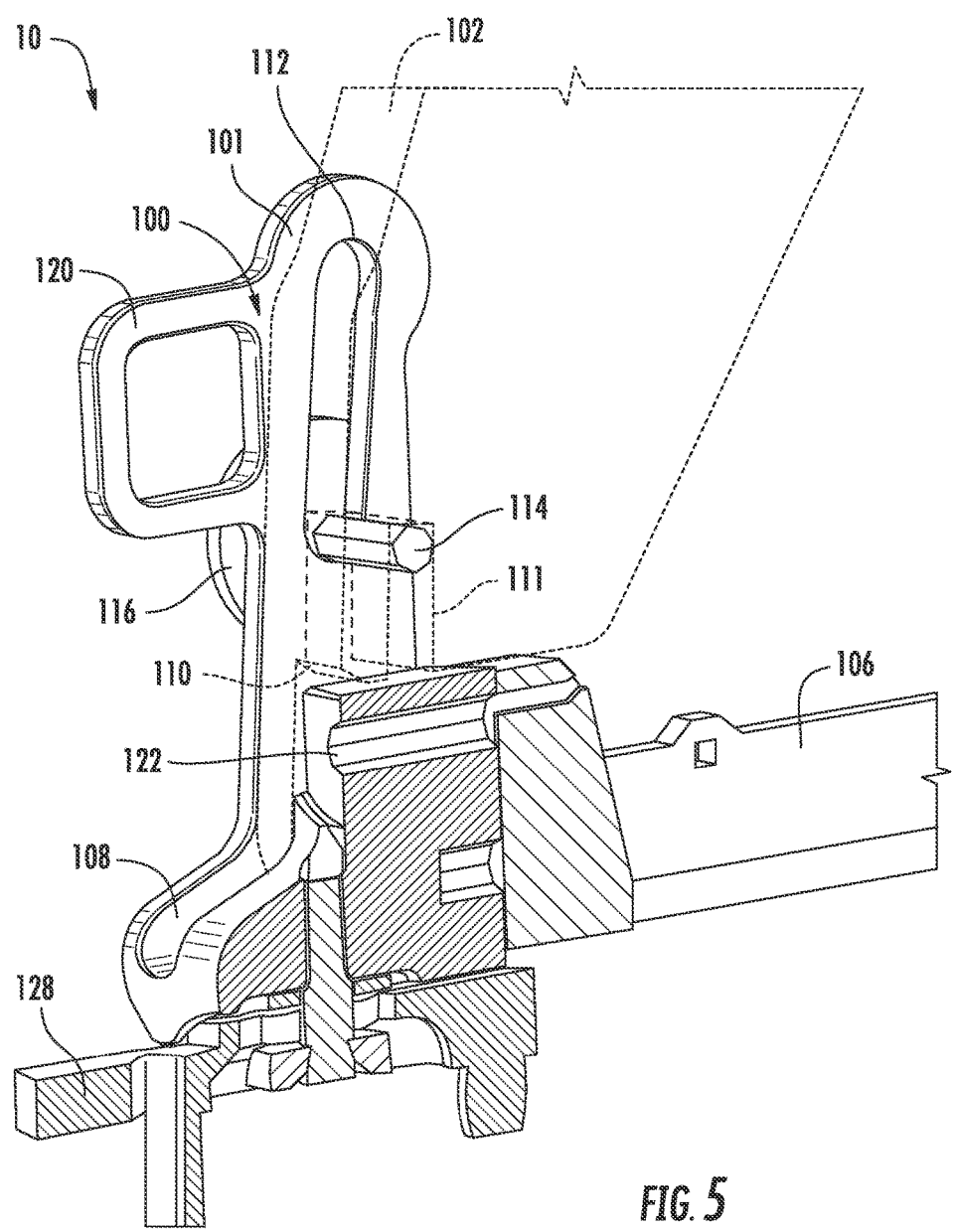
FIG. 5 is a sectional view of the extension joint of FIG. 4.

In some embodiments, the front seat leg 102 may be modified or otherwise optimized for use with the extension fixture 100. For example, the front seat leg 102 may include a clearance recess 110 and a leg slot 111 (FIG. 5). The clearance recess 110 and/or leg slot 111 may allow for greater overlap of the front seat leg 102 with the extension fixture 100. For example, the leg slot 111 may be co-planar, co-linear, or otherwise aligned with the fixture slots 112 such that the bolt 114 may pass through the leg slot 111 and fixture slots 112 to secure the extension fixture 100 to the front seat leg 102. The bolt 114 may be positioned at the bottom of the fixture slots 112 and at the top of the leg slot 111 so that during extension, the extension joint 10 may expand by the combined length of the fixture slots 112 and the leg slot 111. In some embodiments, the leg slot 111 may be curved or otherwise contoured as described with reference to fixture slots 112 above. Greater overlap of the front seat leg 102 and extension fixture 100 allows for greater lengthening of the extension joint 10 during an extension event. Similarly, the extension fixture 100 may include fixture clearance recesses 108 to allow for greater overlap of the front seat leg 102 and extension fixture 100. In certain embodiments, the extension fixture 100 may include one or more loops 120 to receive a baggage bar (not shown) or other structural components of the passenger seat not described above.

Certain embodiments of the extension joint 10 may include additional or alternative features to those shown in FIGS. 1-3. For example, in some embodiments, the front seat leg 102 and extension fixture 100 may be tubular structures, wherein one tubular structure is of a smaller diameter and may telescope into or out of the other structure. In certain other embodiments, the front seat leg 102 and extension fixture 100 may be configured to such that the extension joint 10 is a lap joint, or a double lap joint as shown in FIGS. 1-3.

Still referring to FIGS. 1-3, the extension joint 10 and the structure of the extension fixture 100 in combination with a standard or modified front seat leg 102 allows the cabin floor or other structural support to move relative to the front seat leg 102 in an emergency situation. Under normal operating conditions, such as supporting a passenger and/or luggage loads, the extension joint 10 will function in a manner similar to a standard seat leg attachment. That is, the front seat leg 102 will behave as though it were rigidly attached to the cabin floor or support structure without any relative motion between the front seat leg 102 and the extension fixture 100. However, in an emergency situation, once a threshold level of force is applied between the cabin floor or support structures and the passenger seat, the front seat leg 102 and extension fixture 100 will move relative to one another and lengthen the extension joint 10. By allowing the extension joint 10 to lengthen, forces applied between the cabin floor or support structure and the passenger seat are decreased and/or spread out over a long period of time and/or a greater displacement of the extension joint 10. By lengthening the extension joint 10, the forces applied between the cabin floor or support structure and passenger seat, and thus the front seat leg 102 and extension fixture 100, are reduced. The reduction of forces may prevent or reduce the likelihood of separation of the front floor mount 128 from the cabin floor or support structure.

In order to allow for the extension joint 10 to function as a rigid mounting under normal conditions but allow for relative motion of the front seat leg 102 and extension fixture 100 under emergency conditions, the extension joint must be preloaded or otherwise secured such that it will not lengthen unless a certain threshold level of force is applied to the extension joint 10. The extension fixture 100 must also be affixed or otherwise attached to the front seat leg 102 in a manner that allows relative motion between the two parts, but that will not allow for complete separation of the front seat leg 102 and extension fixture 100 in emergency circumstances when the extension joint 10 is fully lengthened and has reached the end of its range of motion. In certain embodiments, the extension joint 10 may be held together through the use of the bolt 114 that passes through the fixture slots 112, and through the front seat leg 102 and/or the optional leg slot 111. In some embodiments, the extension joint may be held together with pins, rivets, or other fasteners. The bolt 114, pin, rivet, or other fastener should be chosen such that it will not shear and allow complete separation of the extension joint 10. Rather, the bolt 114 or other fastener may act as a stop to prevent the extension joint 10 from failing and allowing complete separation of the front seat leg 102 and extension fixture 100.

The extension joint 10 may be preloaded or otherwise tuned to resist forces below a threshold through any number of mechanical or structural mechanisms or components. For example, the extension fixture 100 may be attached or otherwise affixed to the front seat leg 102 with the bolt 114 passing through the fixture slots 112 and the front seat leg 102 and/or leg slot 111. The bolt 114 may be secured with the use of a nut 118. The bolt 114 and nut 118 may be torqued down sufficiently such that the friction between the head of the bolt 114, nut 118, and extension fixture 100 is sufficient to prevent relative movement between the extension fixture 100 and front seat leg 102 under normal conditions. However, the amount of torque applied to the bolt 114, and the subsequent frictional force between the bolt 114 and the extension fixture 100 may be tuned so that in an emergency situation, the clamping force of the bolt 114 and nut 118 will allow the extension joint 10 to lengthen in response to the increased loading in an emergency situation. In certain embodiments, washers 116 may be used to alter or modify the frictional properties between the bolt 114 and the extension fixture 100 and/or between the nut 118 and the extension fixture 100. The amount of preload and subsequent threshold force necessary to cause lengthening of the extension joint 10 may be increased by using a washer 116 that is embedded with or otherwise includes diamond powder, carbides, locking structures, or other abrasives or friction enhancing features. The extension joint 10 may also include a number of other mechanisms or components to adjust or tune the amount of joint preload and subsequent threshold force required to allow for lengthening of the extension joint 10. For example, shear fasteners, a crush material, corrugated metal, a honeycomb, or a collapsible tube may be incorporated into the extension joint 10 such that the material must be sheared or otherwise deformed to allow the extension joint 10 to lengthen. Similarly, the fixture slots 112 and/or leg slot 111 may comprise a groove or thinner section of material than the body of the extension fixture 100 or the front seat leg 102. The bolt 114 or other fastener may then tear through this thinner section of material or groove once the forces applied to the extension joint 10 have exceeded a threshold value. In some embodiments, the above mentioned preloading or threshold force mechanisms may also provide resistance to continued lengthening of the extension joint 10 throughout its range of motion. The continued resistance may serve to absorb additional energy throughout an extension event. For example, the frictional force of the torqued bolt 114, or the continued shear, material deformation, or material yielding of other force limiting components, will provide a drag or resistance on the lengthening of the extension joint 10 and absorb energy as it continues through its range of motion.

In certain embodiments, the extension joint 10 may also include additional mechanisms to absorb forces both on extension and on rebound or collapse of the extension joint after it has lengthened. For example, the extension joint 10 may include springs, dampers, crushable components, and/or shear components that dampen or absorb energy during lengthening of the extension joint 10 or during the rebound and collapse of the extension joint 10 in an emergency situation. In some embodiments, the friction of the bolt 114 and/or optional washers 116 may continue to resist relative motion of the extension fixture 100 and the front seat leg 102 during collapse or rebound of the extension joint 10. The kinematics and motion of the extension joint 10 itself may also provide some resistance to motion or energy absorption. For instance, depending on the amount of clearance between the extension fixture 100 and front seat leg 102 and the forces applied to the extension joint 10, the extension fixture 100 and front seat leg 102 may become misaligned and bind or otherwise interfere with one another, thereby causing additional friction and/or energy absorption. Also, the bolt 114 and/or nut 118 may cut into, gall, or otherwise deform the extension fixture 100 and/or front seat leg 102 and absorb the energy of lengthening or collapse of the extension joint 10.

Figure 4:
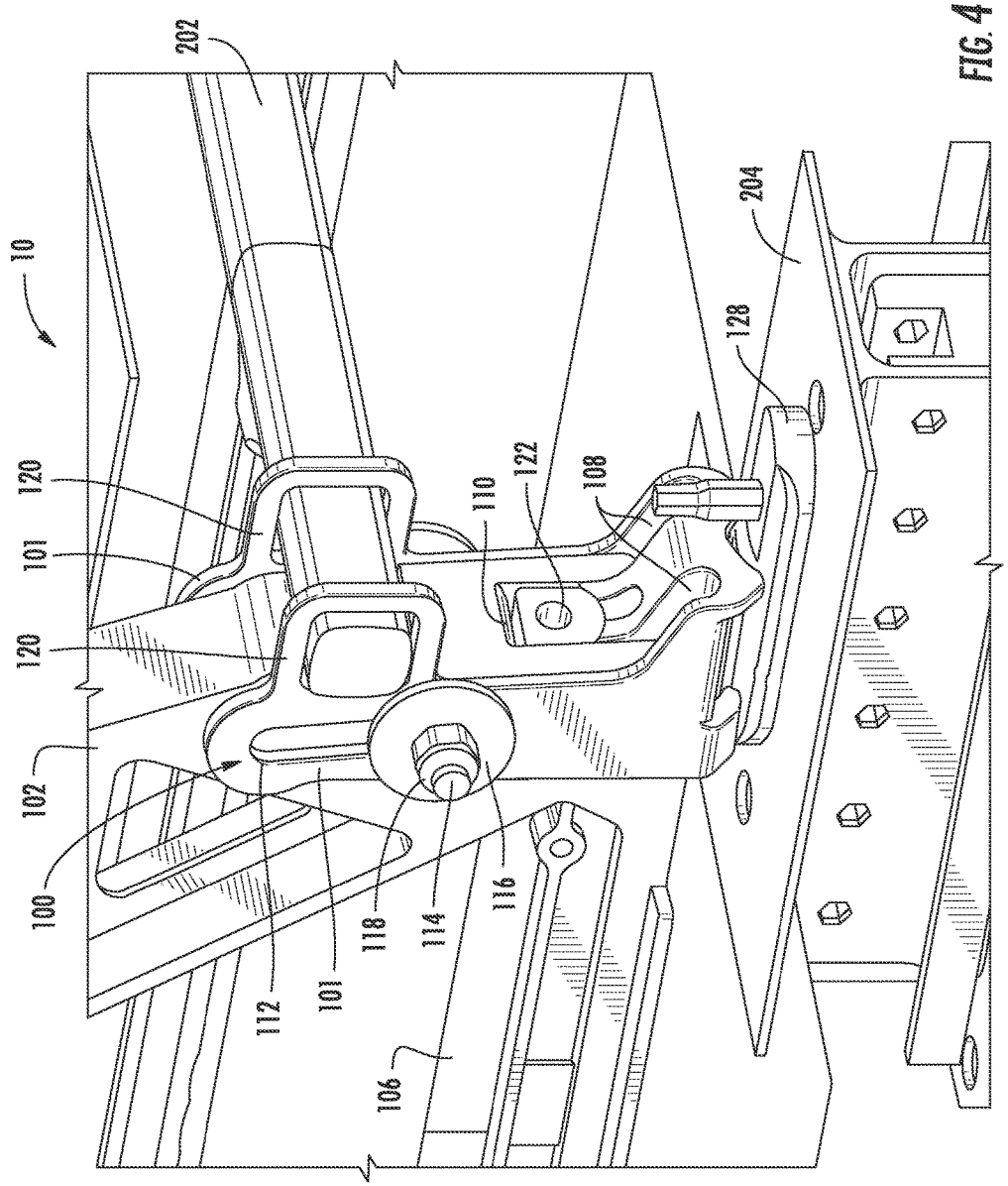
FIG. 4 is a perspective view of an extension joint according to certain embodiments of the present invention.

FIG. 4 is a perspective view of an extension joint 10 attached to a floor support 204 and integrated into a passenger seat. The extension fixture 100 is affixed or otherwise attached to the floor support 204 through a front floor mount 128. The base member 106 is attached to the extension fixture 100 at the rotation joint 122. The front seat leg 102 is positioned between the uprights 101 and a bolt 114 passing through the fixture slots 112 and the front seat leg 102 is secured by nut 118 and washer 116. The extension fixture 100 includes loops 120 that are configured to receive baggage bar 202. In certain embodiments, the front seat leg 102 may include a clearance recess 110 configured to allow for a greater overlap between the front seat leg 102 and the extension fixture 100 and provide clearance with the rotation joint 122. Similarly, the extension fixture 100 may include fixture clearance recesses 108 to allow for additional overlap and clearance between the extension fixture 100 and any protuberances or extensions of the front seat leg 102.

FIG. 5 is a sectional view of the extension joint 10 depicted in FIG. 4. The extension fixture 100 is affixed or otherwise attached to the base member 106 at the rotation joint 122. The rotation joint allows for articulation of the extension fixture 100 about the axis of the extension joint 122 with respect to the base member 106. This extra degree of freedom allows the extension joint 10 to rotate in an emergency situation, preventing unwanted binding or restriction of the extension joint 10 that my cause it to not lengthen as intended. Furthermore, the addition of the rotation joint 122 may allow for the extension fixture 100 to be directly mounted to the cabin floor or structural supports without the need a separate mounting fixture. The front seat leg 102 is positioned between the uprights 101 of the extension fixture 100. A bolt 114 passes through fixture slot 112 and leg slot 111 to secure the front seat leg 102 to the extension fixture 100. A washer 116 is included with the bolt 114. The extension fixture includes loop 120 that is configured to receive other parts of the seat structure, such as a baggage bar.

Still referring to FIG. 5, the front seat leg 102 includes a clearance recess 110 configured to accommodate the rotation joint 122 and allow for increased overlap of the front seat leg 102 and extension fixture 100. Similarly, the extension fixture 100 includes fixture clearance recess 108 to accommodate the lower portions of the front seat leg 102. The extension fixture 100 is secured to the cabin floor or support structure through front floor mount 128.

The extension joint 10 is shown in an initial, or un-lengthened, position. In this position, the maximum overlap between the extension fixture 100 and front seat leg 102 may be desirable. To allow for the greatest amount of overlap, and consequently the largest amount of lengthening of the extension joint 10, the bolt 114 is positioned at the lower extremity of the fixture slot 112 and the upper extremity of the leg slot 111. When the extension joint 10 lengthens, the bolt 114 may move through the entire length of the fixture slot 112 and the entire length of the leg slot 111 to provide a longer range of motion than if only a single slot were used. For example, as the front seat leg 102 and extension fixture 100 move away from one another to disengage, the bolt 114 will translate from the bottom of the fixture slot 112 to the top of the fixture slot 112. During this motion, the bolt 114 may also translate through the leg slot 111 from its uppermost extremity to its lower extremity. In order to facilitate the motion of the bolt 114 through both the fixture slot 112 and the leg slot 111, the fixture slot 112 and leg slot 111 may be co-linear, co-planar, or otherwise aligned such that the motion of the bolt 114 through the fixture slot 112 is compatible with the motion of the bolt 114 through the leg slot 111 and vice versa. In certain embodiments, the fixture slot 112 and/or leg slot 111 may be curved or otherwise contoured to reflect the kinematics and motion of the front seat leg 102 and/or extension fixture 100 during a lengthening event.

Figure 6:
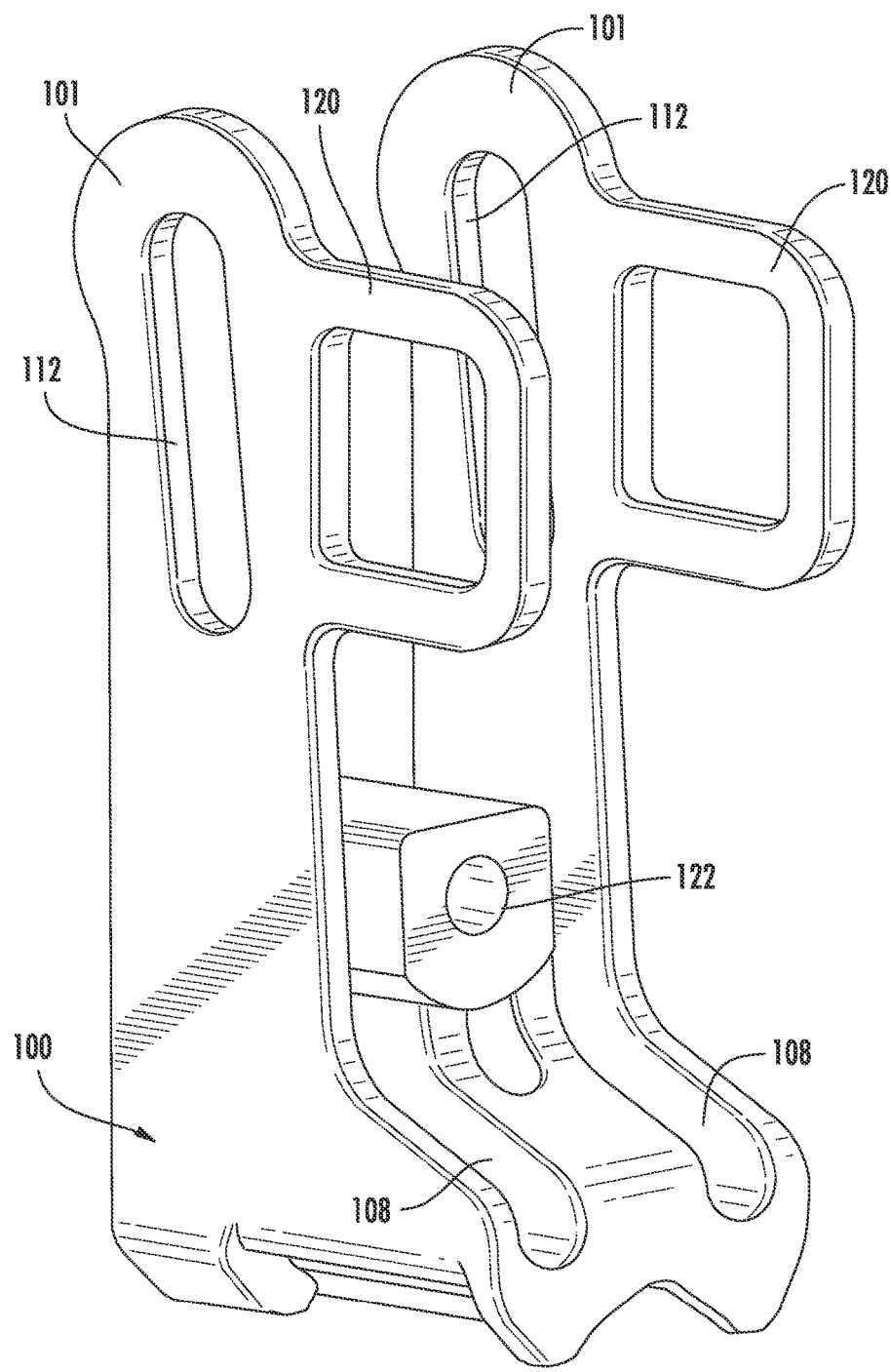
FIG. 6 is a perspective view of an extension fixture according to certain embodiments of the present invention.

FIG. 6 is a perspective view of saddle-type extension fixture 100. The extension fixture 100 may comprise two uprights 101 that include fixture slots 112 configured to allow a bolt or other fastener to pass through the fixture slots 112. The extension fixture 100 may also include a rotation joint 122 to allow the extension fixture to pivot about a base member (not shown), loops 120 to receive additional seat structures or components, and/or fixture clearance recesses 108 to accommodate or otherwise provide space for a front seat leg (not shown) or other components. The saddle-type extension fixture 100 is configured to cradle a seat leg between the uprights 101 and pin or otherwise fasten the extension fixture 100 to the seat leg by passing a fastener through the fixture slots 112. The fixture slots 112 also provide the motion path for the lengthening of the extension joint in an emergency situation. As shown, the extension fixture 100 would provide for a double-lap type joint between the extension fixture 100 and a seat leg. However, the extension fixture 100 may also be configured to provide a telescoping joint, a single lap joint, and/or such that the uprights 101 fit within the seat leg.

FIGS. 7-11 are perspective views of a passenger seat assembly 1 incorporating an extension joint 10 during various stages of an emergency situation and/or testing simulation. The passenger seat assembly 1 comprises a front seat leg 102, rear seat leg 104, and base member 106. The rear seat leg 104 and base member 106 are affixed or otherwise attached to one another at the rear leg joint 130, which is attached to the cabin floor or structural support through rear floor mount 132. The base member 106 is affixed or otherwise attached to the extension fixture 100 at the rotation joint 122. Front seat leg 102, including leg slot 111 and clearance recess 110, is positioned within the extension fixture 100. Bolt 114 passes through fixture slot 112 and leg slot 111 to connect the front seat leg 102 to the extension fixture 100. Washer 116 may provide additional friction modification to bolt 114. The extension fixture 100 also includes loops 120, which are configured to receive baggage bar 202. The front floor mount 128 rigidly connects the floor support 204 to the extension fixture 100, and ties the extension joint 10 and its associated components to the cabin floor or support structure.

Figure 7:
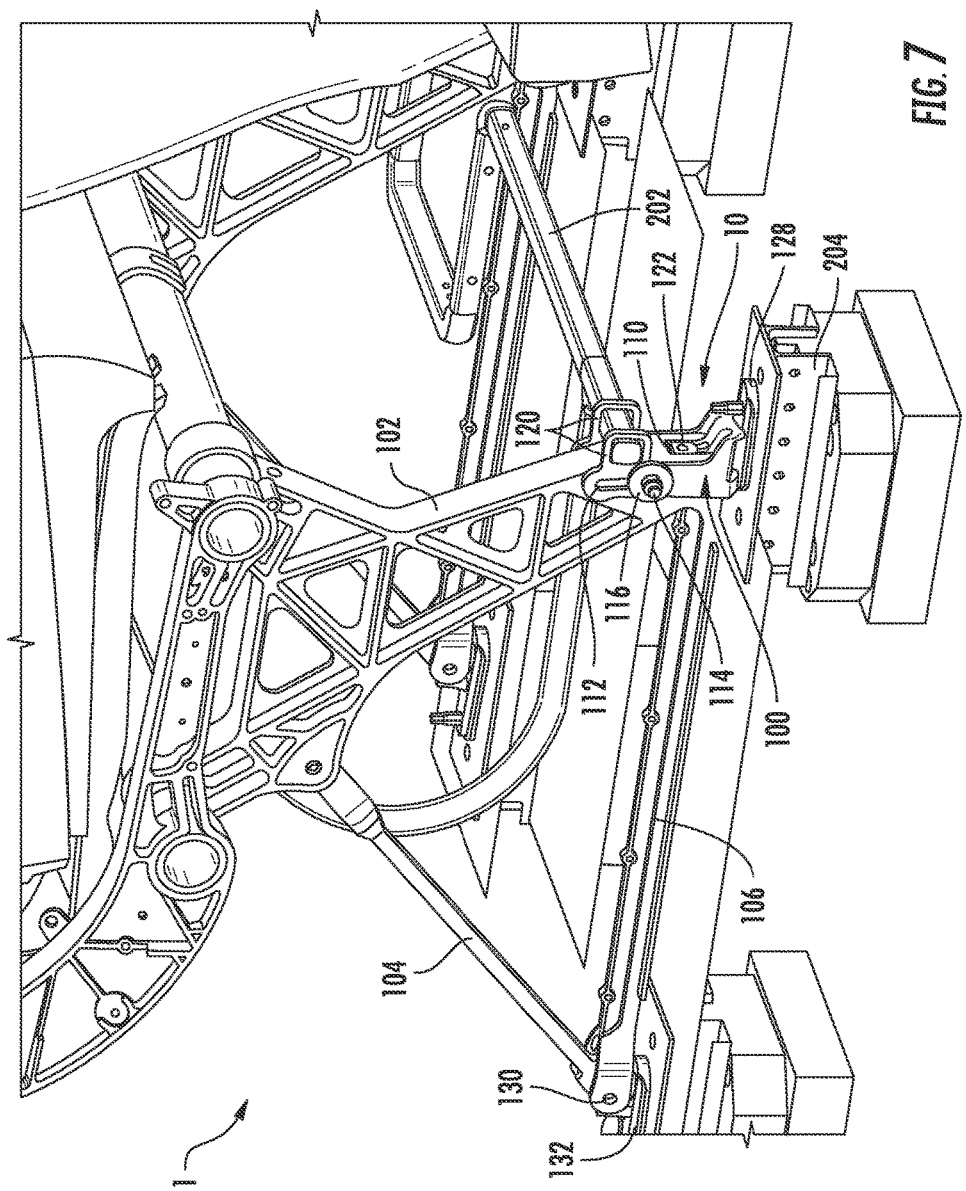
FIG. 7 is a perspective view of an extension joint in an initial position according to certain embodiments of the present invention.
Figure 8:
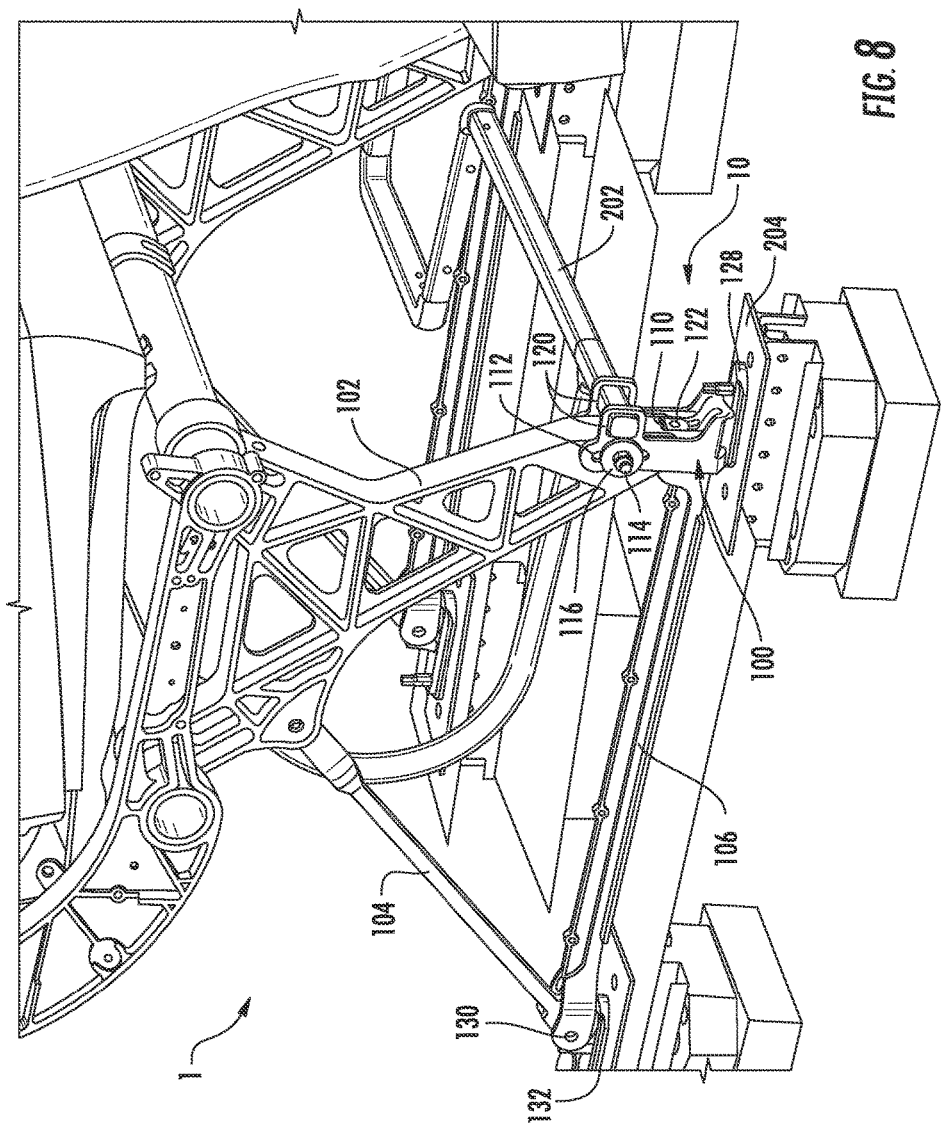
FIG. 8 is a perspective view of the extension joint of FIG. 7 in a partially extended position.
Figure 9:
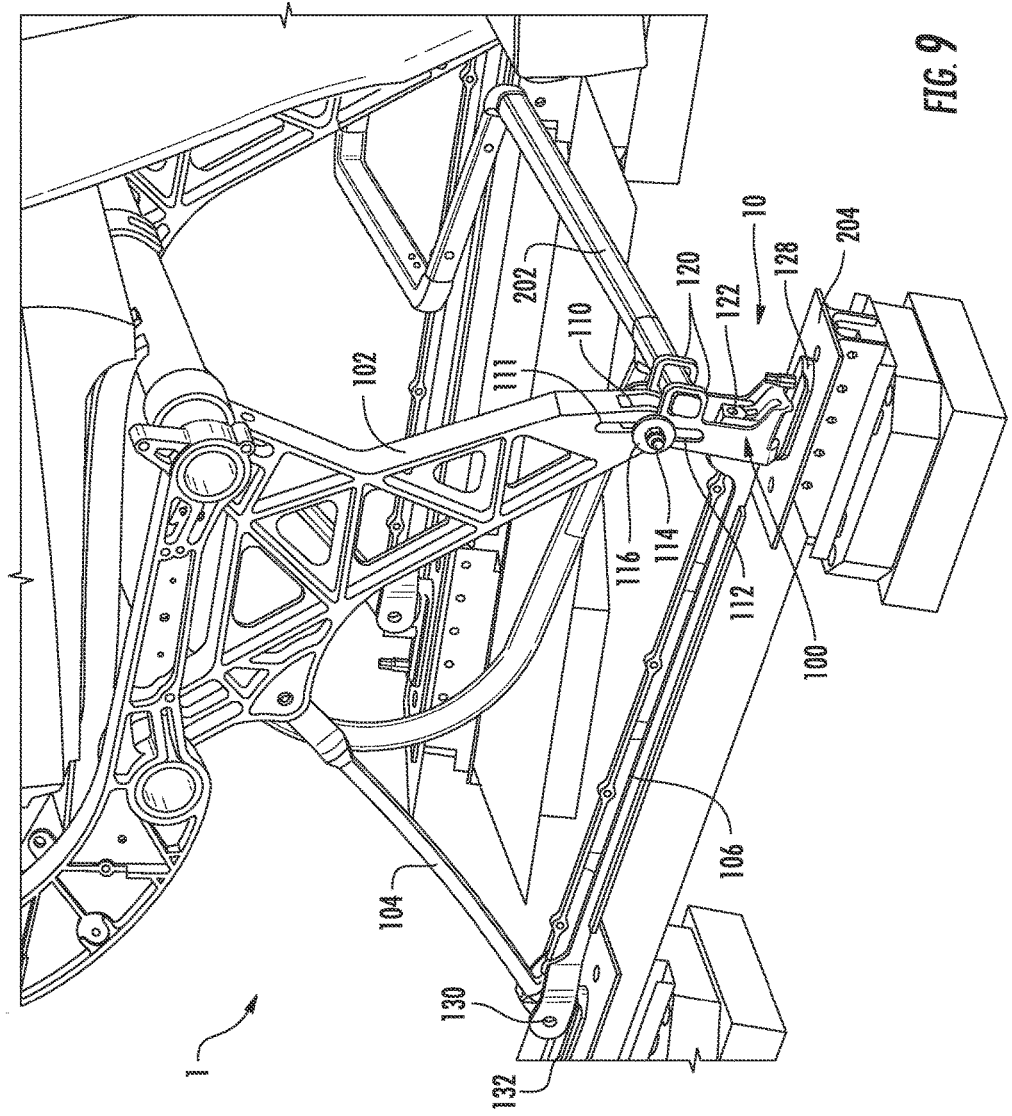
FIG. 9 is a perspective view of the extension joint of FIG. 7 in a fully extended position.

FIG. 7 shows the passenger seat assembly 1 and the extension joint 10 in an initial, un-lengthened position. In this position, the front seat leg 102 and extension fixture 100 are fully engaged and have the greatest amount of overlap between their components and the fixture slots 112 and leg slot 111. In FIG. 8, the floor support 204 has been moved downwards, moving the front floor mount 128 and the extension fixture 100 with it. Under these conditions, the threshold force to overcome the preload of the extension joint 10 has been met, and the extension joint 10 has begun to lengthen. As shown, as the extension fixture 100 moves downward with the floor support 204, the extension fixture 100 and front seat leg 102 begin to disengage and separate. Bolt 114 is displaced from its previous position in FIG. 7, and the baggage bar 202 has begun to articulate downwards with the extension fixture 100. FIG. 9 shows the extension joint 10 in a fully lengthened position. Here, the floor support 204 has completed its downward motion and the front seat leg 102 and extension fixture 100 are fully disengaged and extended. The bolt 114 has been displaced from its original position at the lower extremity of the fixture slot 112 and upper extremity of the leg slot 111 to a new position at the lower extremity of the leg slot and upper extremity of the fixture slot 112. In this position, the bolt 114 will prevent further lengthening and separation of the extension joint 10. In this position, the base member 106 and baggage bar 202 have also articulated and/or rotated downwards in response to the lowering of the floor support 204. The baggage bar 202, because of its attachment to the extension fixture 100 through loops 120, has followed the displacement of the floor (not shown) as the floor support 204 has been lowered. As a result, the baggage bar 202 will maintain its relationship to the floor and continue to restrain any luggage or items that were stowed under the passenger seat assembly 1. Also, rotation joint 122 has allowed the extension fixture 100 to pivot about the base member 106 as it articulates through its range of motion. By allowing the extension fixture 100 to rotate about the base member, the extension fixture 100 and extension joint 10 maintain proper alignment with the front seat leg 102 without excessive binding that would interfere with the lengthening and proper function of the extension joint 10.

Figure 10:
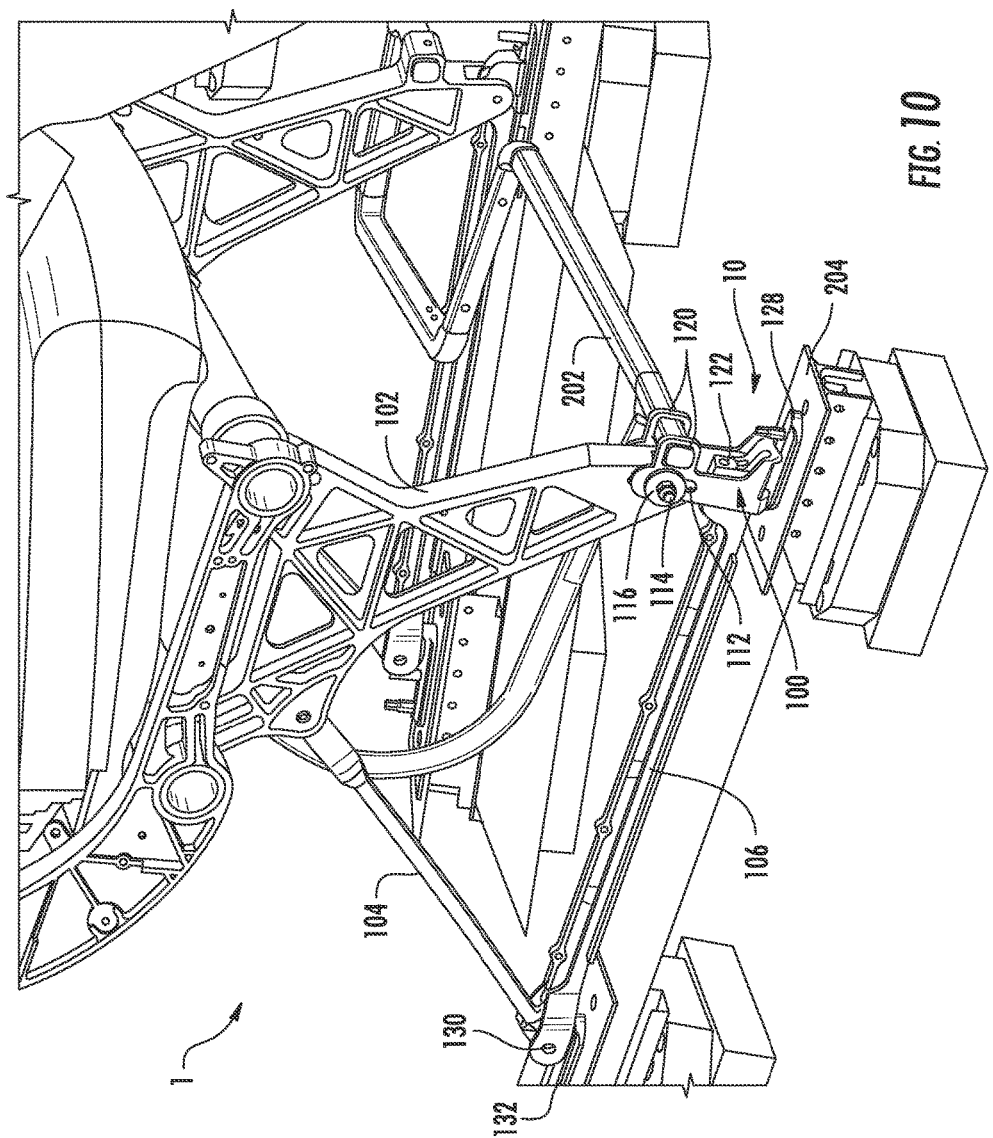
FIG. 10 is a perspective view of the extension joint of FIG. 7 in a partially collapsed position.
Figure 11:
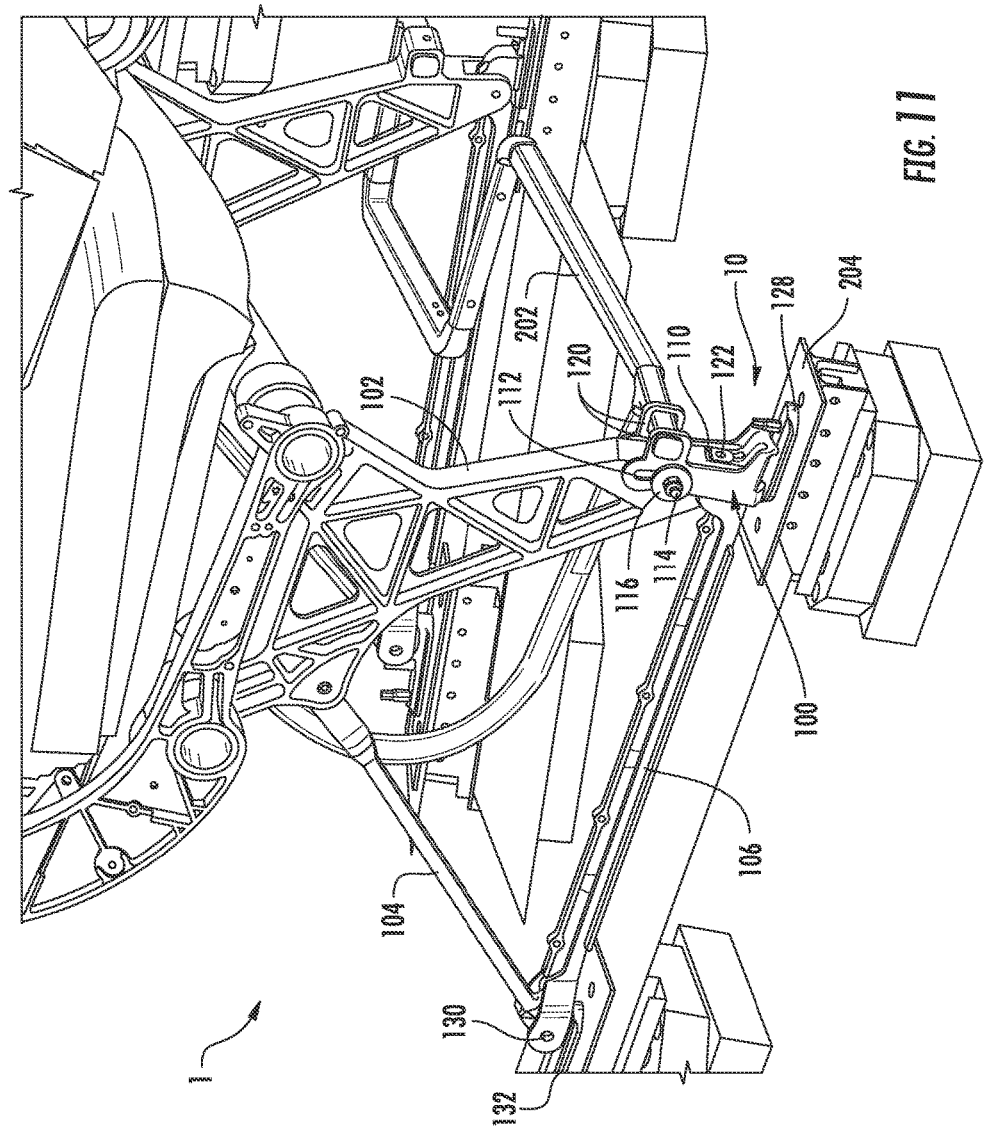
FIG. 11 is a perspective view of the extension joint of FIG. 7 in a fully collapsed position.
Figure 12:
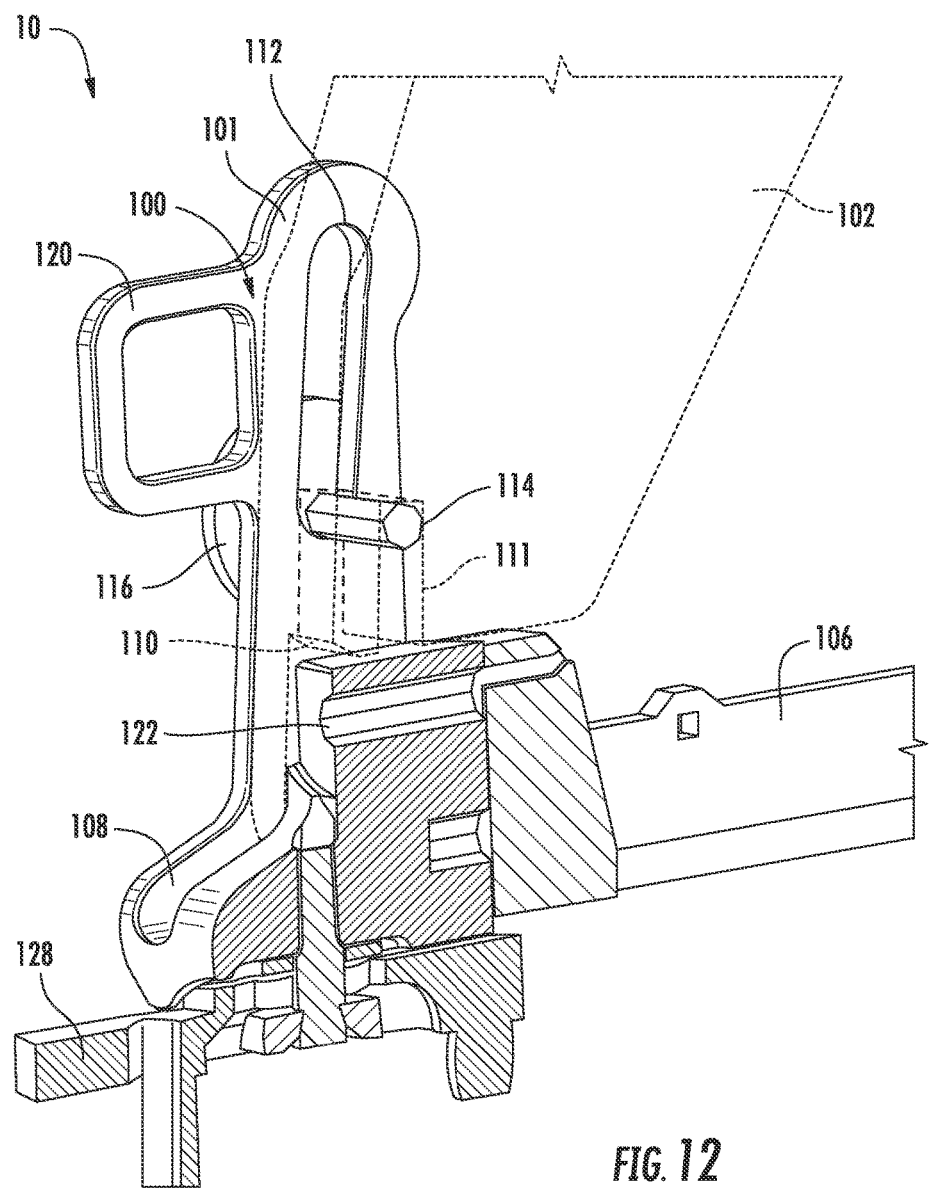
FIG. 12 is a sectional view of an extension joint in an initial position according to certain embodiments of the present invention.

In FIG. 10, the extension joint 10 has begun to collapse because the floor support 204 has reached the end of its motion, and the passenger seat assembly 1 has begun to rebound and fall, causing the extension joint 10 to return to an engaged, un-lengthened, position. The front seat leg 102 and leg slot 111 are partially engaged and overlapped with the extension fixture 100 and fixture slots 112. The bolt 114 is also displaced within the slots 111, 112 such that it is not at an extremity of one or more of the slots 111, 112. FIG. 11 shows the extension joint 10 in a fully collapsed position after the passenger seat assembly 1 has fully rebounded into a rest position. The floor support 204 remains in a lowered position, and the base member 106 and baggage bar 202 are rotated or articulated from their original starting positions. Here, the front seat leg 102 is fully engaged with the extension fixture 100. The front seat leg 102 and leg slot 111 are fully overlapped with the extension fixture 100 and fixture slots 112. Due to the motion of the extension joint 10, the bolt 114 may not return to its original position and may remain partially or fully displaced as shown. By allowing the lengthening of the extension joint 10, the force applied to the passenger seat assembly 1 and front floor mount 128 has been greatly reduced because it has been extended over a longer period of time and a longer range of motion. This reduction in force results in a reduced likelihood of separation between the front floor mount 128 and the floor support 204, and a reduced likelihood of damage to other components in the passenger seat assembly 1. Furthermore, the reduction in force and increased flexibility of the extension joint 10 may help prevent damage to other seat mounts or joints such as the rear floor mount 132 and rear leg joint 130.

Figure 14:
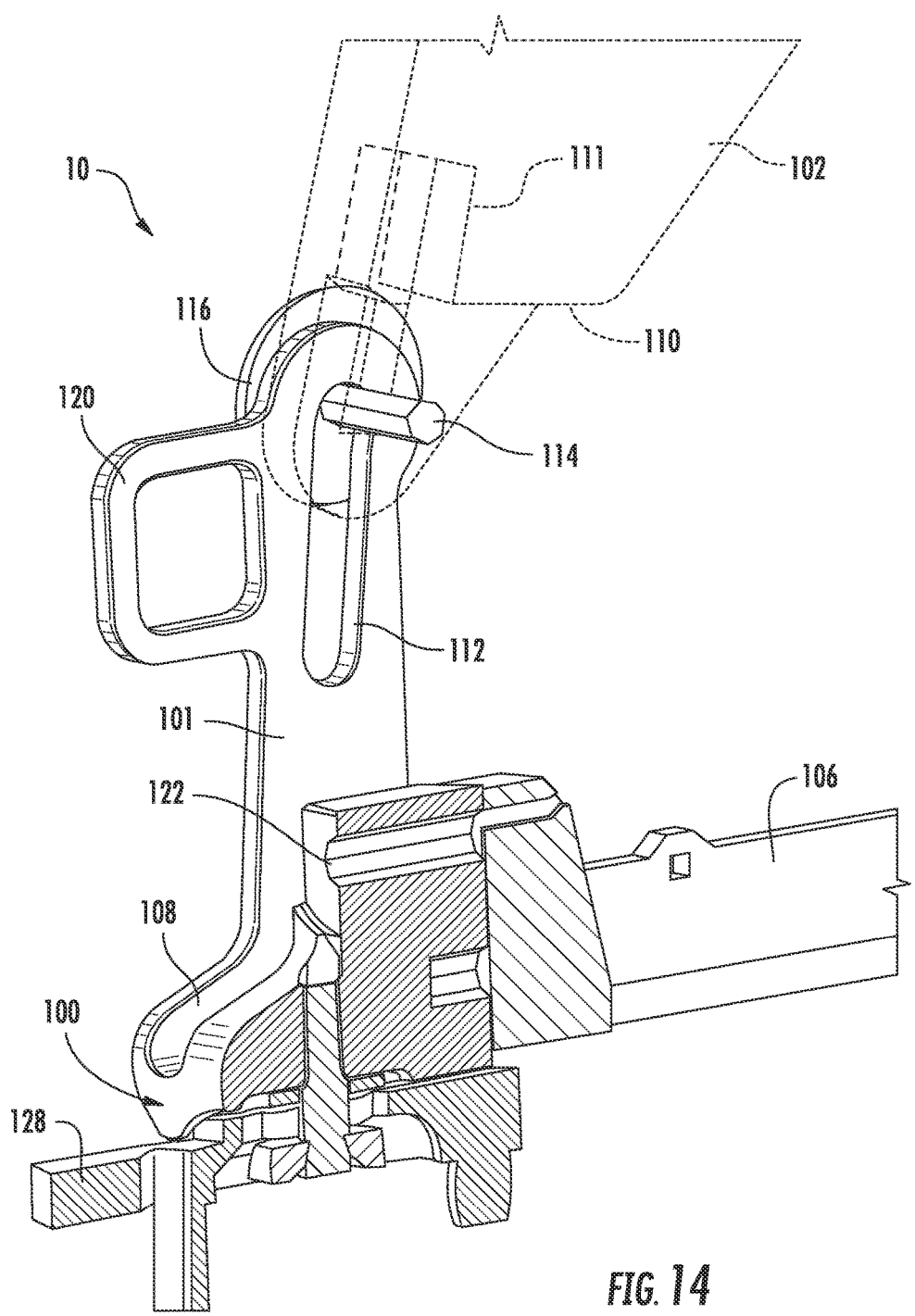
FIG. 14 is a sectional view of the extension joint of FIG. 12 in a fully extended position.
Figure 15:
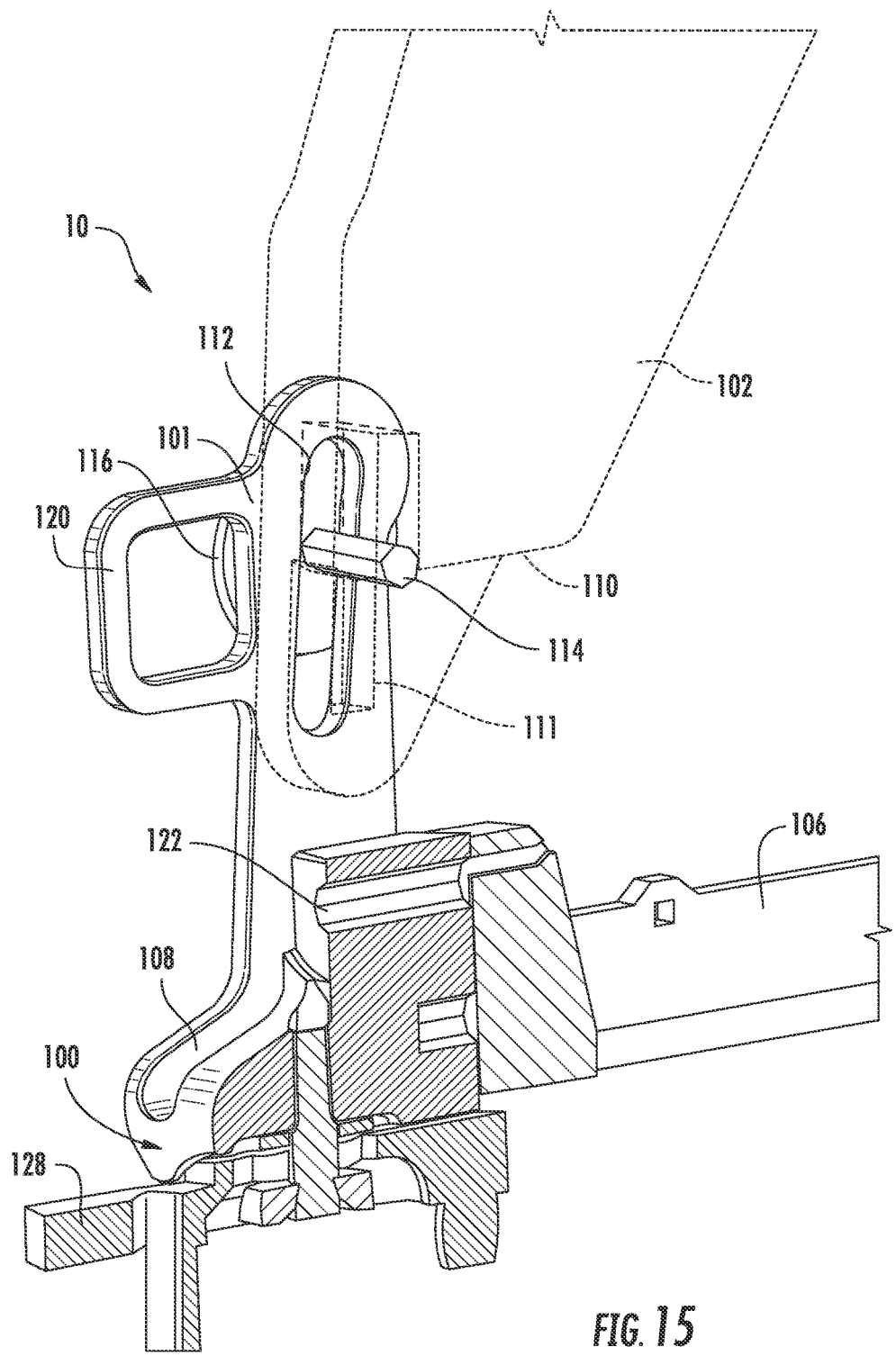
FIG. 15 is a sectional view of the extension joint of FIG. 12 in a partially collapsed position.
Figure 16:
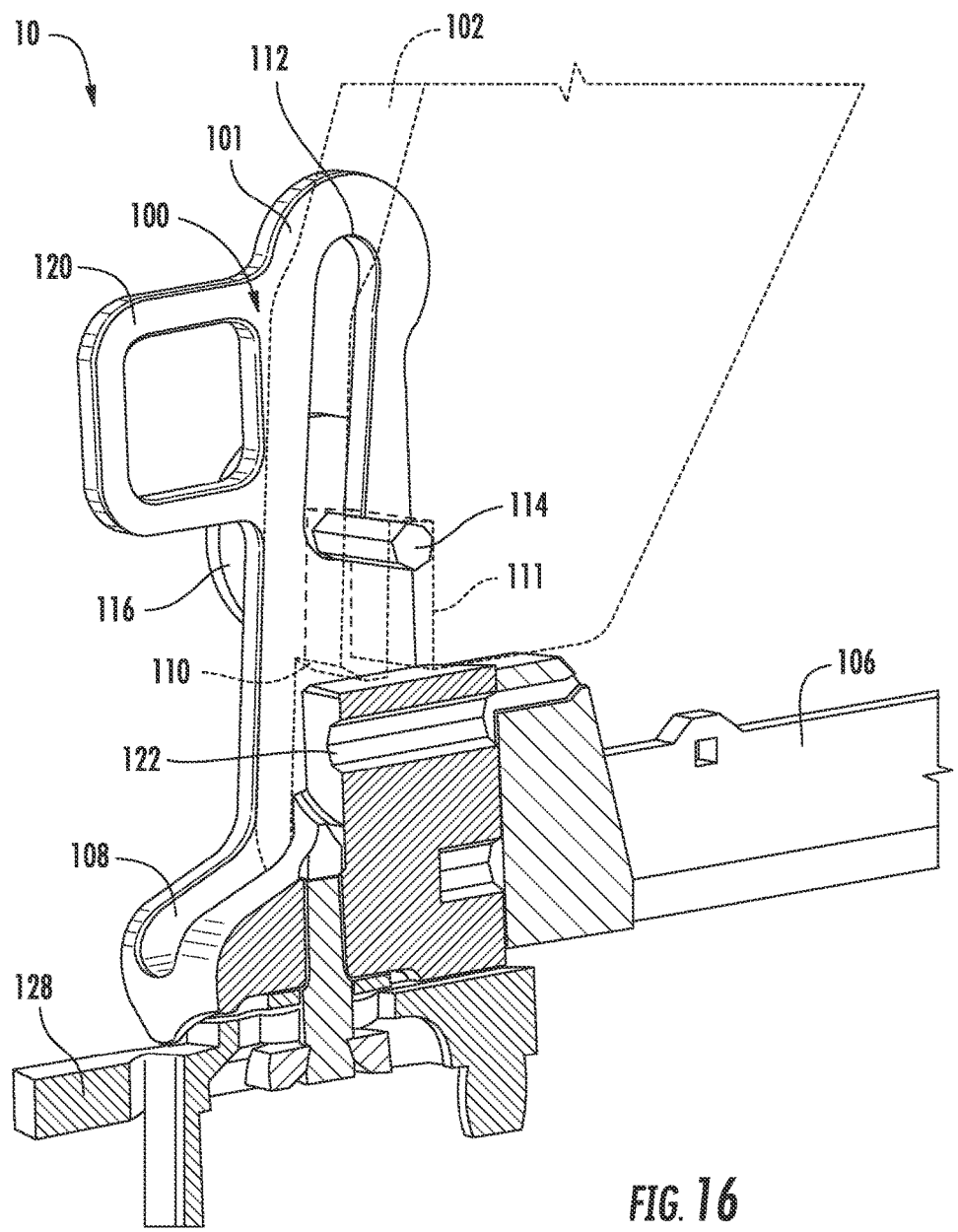
FIG. 16 is a sectional view of the extension joint of FIG. 12 in a fully collapsed position.

FIGS. 12-16 are sectional vies of the extension joint 10 as it moves through its range of motion from an initial, un-lengthened, position (FIG. 12), to a fully extended position (FIG. 14), and a fully collapsed position (FIG. 16). The extension joint 10 may comprise an front seat leg 102 including a leg slot 111 and clearance recess 110. The front seat leg 102 is slidably coupled to the extension fixture 100 by bolt 114, which passes through upright 101 via the fixture slot 112 and leg slot 111. Washer 116 may provide improved frictional properties or force distribution from the torqued bolt 114. The base member 106 is affixed or otherwise attached to the extension fixture 100 through rotation joint 122. The extension fixture 100 also includes loop 120 to receive additional seat structures or components, and fixture clearance recess 108 to accommodate the lower portions of the front seat leg 102. The extension joint 10 is rigidly attached to the cabin floor or support structure (not shown) through the front floor mount 128.

Figure 13:
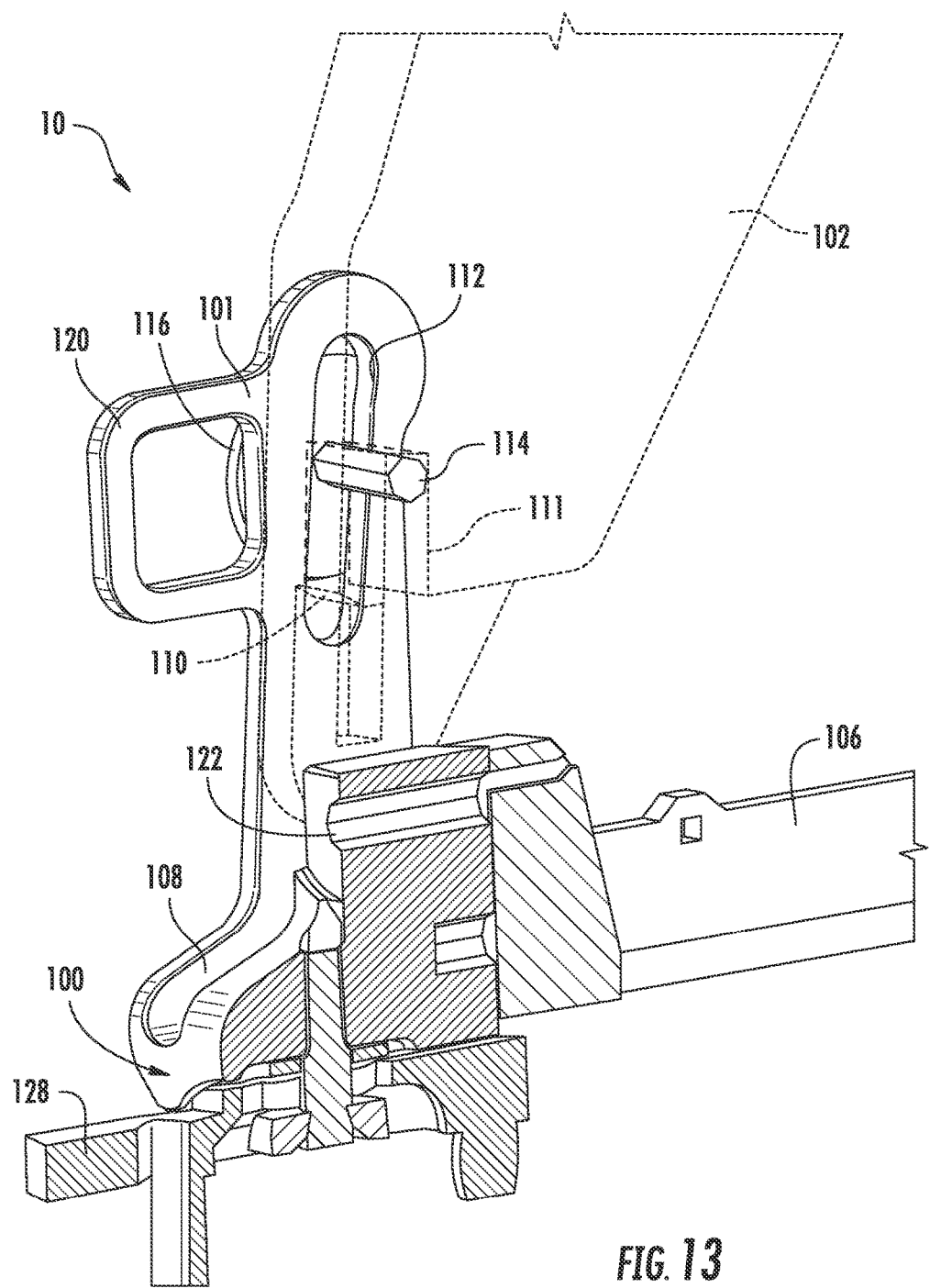
FIG. 13 is a sectional view of the extension joint of FIG. 12 in a partially extended position.

The extension joint 10 begins in an initial, un-lengthened position (FIG. 12), wherein the front seat leg 102 is fully engaged within the upright 101 of the extension fixture 100. In this position, the bolt 114 is at the upper extremity of the leg slot 111 and the lower extremity of the fixture slot 112. The clearance recess 110 and fixture clearance recess 108 facilitate greater overlap of the front seat leg 102 and extension fixture 100. As the front floor mount 128 is pulled downwards, as with a test procedure or in an emergency, the extension joint 10 begins to lengthen and disengage the front seat leg 102 from the extension fixture 100 (FIG. 13). The bolt 114 is displaced within the fixture slot 112 and leg slot 111 as the extension joint 10 lengthens to absorb distribute forces applied through the front floor mount 128. As the front floor mount 128 continues its relative downward motion, the extension joint 10 will eventually reach a fully lengthened position (FIG. 14). In this position, the bolt 114 has reached the upper extremity of the fixture slot 112 and the lower extremity of the leg slot 111. In this position, the interference of the bolt 114 with the walls of the fixture slot 112 and/or leg slot 111 will prevent further extension and separation of the extension joint 10. As shown, to allow for additional length of the leg slot 111, the leg slot may extend below the clearance recess 110 into the lower extremities of the front seat leg 102, which are received by the fixture clearance recesses 108.

After the front floor mount 128 has reached its final position, the extension joint 10 will begin to collapse and return to a fully engaged, un-lengthened, position (FIG. 15). The front seat leg 102 will begin its downward motion to re-engage the extension fixture 100. As the front seat leg 102 rebounds, the leg slot 111 and fixture slots 112 will begin to overlap, and the bolt 114 will be displaced within the slots 111, 112. The front seat leg 102 will continue its downward motion until it is fully engaged with the extension fixture 100 (FIG. 16). In this position, the extension joint 10 is in a collapsed position, and has returned to substantially its original length. Due to the displacement of the bolt 114 through the range of motion of the extension joint 10, the bolt may remain displaced from its initial position. However, because of the clamping force of the bolt, or any other applicable force absorbing or dampening components or mechanisms, the extension joint 10 may still retain all or a portion of its preload. As a result, the extension joint 10 may endure multiple loading cycles while maintaining its force absorption and movement threshold properties.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An extendable joint configured for a passenger seat, the extendable joint comprising:
   a first joint portion comprising a first slot;
   a second joint portion comprising a second slot; and
   a preload mechanism, wherein:
   the preload mechanism stabilizes the extendable joint up to a threshold force and allows a relative motion between the first joint portion and the second joint portion beyond the threshold force;
   after exceeding the threshold force, a portion of the preload mechanism moves through at least a portion of the first slot and through at least a portion of the second slot; and
   in at least one position based on the relative motion between the first joint portion and the second joint portion, the first slot and the second slot are non-parallel with one another.

2. The extendable joint of claim 1, further comprising:
   a third joint portion; and
   a rotation joint;
   wherein the second joint portion and the third joint portion may rotate with respect to one another about the rotation joint.

3. The extendable joint of claim 1, further comprising:
   an un-lengthened position wherein the portion of the preload mechanism is disposed at an uppermost end of the first slot in the first joint portion and the portion of the preload mechanism is disposed at a lowermost end of the second slot in the second joint portion; and
   a fully lengthened position wherein the portion of the preload mechanism is disposed at a lowermost end of the first slot in the first joint portion and the portion of the preload mechanism is disposed at an uppermost end of the second slot in the second joint portion.

4. The extendable joint of claim 1, wherein the first slot and the second slot comprise a curve matching an arc of motion of the extendable joint.

5. The extendable joint of claim 1, wherein the first joint portion is configured to telescope relative to the second joint portion.

6. The extendable joint of claim 1, wherein the first joint portion and the second joint portion form a double-lap joint.

7. The extendable joint of claim 1, wherein the preload mechanism comprises at least one of a bolt, a friction washer, a shear fastener, a rip-through material, a crush material, a corrugated metal, a honeycomb, or a collapsible tube.

8. The extendable joint of claim 1, further comprising a rebound damping mechanism.

9. The extendable joint of claim 8, wherein the rebound damping mechanism comprises at least one of a spring, a damper, a crushable component, a shear pin, friction, binding of the extendable joint, galling of the first joint portion, galling of the second joint portion, or a friction washer.

10. The extendable joint of claim 1, wherein:
    the first joint portion comprises a front seat leg with a first clearance recess;
    the second joint portion comprises an extension fixture with a second clearance recess;
    the portion of the preload mechanism comprises a bolt passing through the first slot and the second slot; and
    the bolt is torqued to a preload to prevent the relative motion of the front seat leg and the extension fixture up to the threshold force, the first clearance recess accommodates a portion of the extension fixture, and the second clearance recess accommodates a portion of the front seat leg.

11. The extendable joint of claim 1, wherein the second joint portion comprises at least one clearance recess, wherein the at least one clearance recess comprises an area adjacent to a raised side wall of the second joint portion such that the at least one clearance recess accommodates and provides clearance for a portion of the first joint portion.

12. The extendable joint of claim 1, wherein the first joint portion and the second joint portion rotate relative to one another about the preload mechanism.

13. The extendable joint of claim 1, wherein the first slot and the second slot each comprise a constant cross-section along an entire length of each of the first slot and the second slot.

14. A passenger seat comprising:
a front seat leg comprising a first slot and a first clearance recess;
a rear seat leg;
a base member;
a rear leg joint;
an extension fixture comprising a second slot and a second clearance recess; and
a preload mechanism;
wherein the front seat leg and the extension fixture are coupled such that the first slot and the second slot are overlapping, the first clearance recess accepts a portion of the extension fixture, the second clearance recess accepts a portion of the front seat leg to form an extendable joint, wherein:
the preload mechanism prevents relative motion of the front seat leg and the extension fixture below a threshold force; and
after exceeding the threshold force, a portion of the preload mechanism moves through at least a portion of the first slot and through at least a portion of the second slot; and
the relative motion of the front seat leg and the extension fixture after exceeding the threshold force causes the front seat leg to rotate about the rear leg joint.

15. The passenger seat of claim 14, wherein the base member is rotatably coupled to the extension fixture to allow rotation of the base member with respect to the extension fixture and the front seat leg.

16. The passenger seat of claim 14, further comprising a baggage loop configured to receive a baggage bar.

17. The passenger seat of claim 14, wherein the front seat leg telescopes with respect to the extension fixture.

18. The passenger seat of claim 14, wherein the preload mechanism comprises at least one of a bolt, a friction washer, a shear fastener, a rip-through material, a crush material, a corrugated metal, a honeycomb, or a collapsible tube.

19. The passenger seat of claim 14, further comprising a rebound damping mechanism.

20. The passenger seat of claim 19, wherein the rebound damping mechanism comprises at least one of a spring, a damper, a crushable component, a shear pin, friction, binding of the extendable joint, galling of the front seat leg, galling of the extension fixture, or a friction washer.

21. A method for preventing separation of a passenger seat from a cabin floor, the method comprising:
providing a joint between a front seat leg and a fixture;
preloading the joint to prevent relative motion of the of the front seat leg and the cabin floor under normal conditions; and
lengthening the joint such that the cabin floor and the front seat leg may partially separate in response to a force exceeding a threshold determined by the preloading of the joint, wherein:
the front seat leg comprises a first slot and the fixture comprises a second slot;
after exceeding the threshold, a portion of the joint moves through at least a portion of the first slot and through at least a portion of the second slot; and
during lengthening of the joint, in at least one position of the joint, the first slot and the second slot are non-parallel with one another.

22. The method of claim 21, further comprising damping a rebound motion of the joint.

23. The method of claim 21, further comprising providing a rotation joint between a base member and the cabin floor; and
rotating the base member relative to the cabin floor to prevent separation of the passenger seat from the cabin floor.

* * * * *